United States Patent [19]

Pierpoint

[11] 4,273,999
[45] Jun. 16, 1981

[54] EQUI-VISIBILITY LIGHTING CONTROL SYSTEM

[75] Inventor: William Pierpoint, Camarillo, Calif.

[73] Assignee: The United States of America as represented by the Secretary of the Navy, Washington, D.C.

[21] Appl. No.: 113,426

[22] Filed: Jan. 18, 1980

[51] Int. Cl.³ .............................................. G01J 1/32
[52] U.S. Cl. ................................... 250/205; 315/158; 250/214 AL
[58] Field of Search ...................... 250/205, 214 AL; 315/158, 151

[56] References Cited

U.S. PATENT DOCUMENTS

| | | | |
|---|---|---|---|
| 4,135,116 | 1/1979 | Smith | 315/158 |
| 4,158,132 | 6/1979 | O'Dell | 250/205 |

*Primary Examiner*—David C. Nelms
*Assistant Examiner*—Darwin R. Hostetter
*Attorney, Agent, or Firm*—Richard S. Sciascia; Joseph M. St. Amand; William C. Daubenspeck

[57] ABSTRACT

A system and method for providing substantially constant visibility over a task area within a work area with time in which the visibility provided by natural daylight illumination is supplemented by a variable artificial illumination from luminaires to maintain a specified visibility. The background luminance and the difference luminance are determined as a function of the artificial illumination and the natural daylight. These relationships are used to determine the actual visibility at the task. The actual visibility is then compared with a criterion visibility and the intensity of the artificial illumination from the luminaires is varied to bring the actual visibility to the criterion visibility.

4 Claims, 8 Drawing Figures

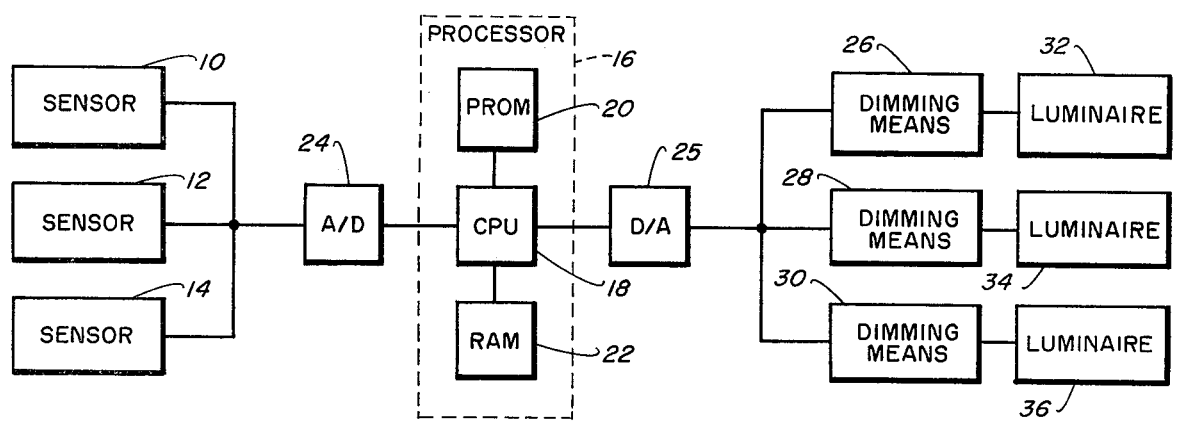
Fig. 1.
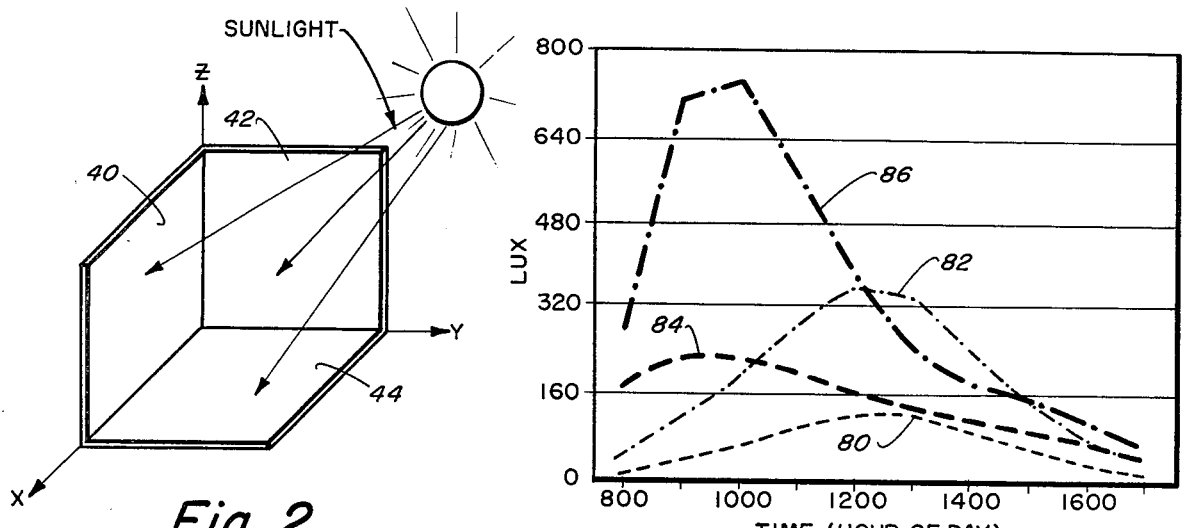
Fig. 2.
Fig. 7.
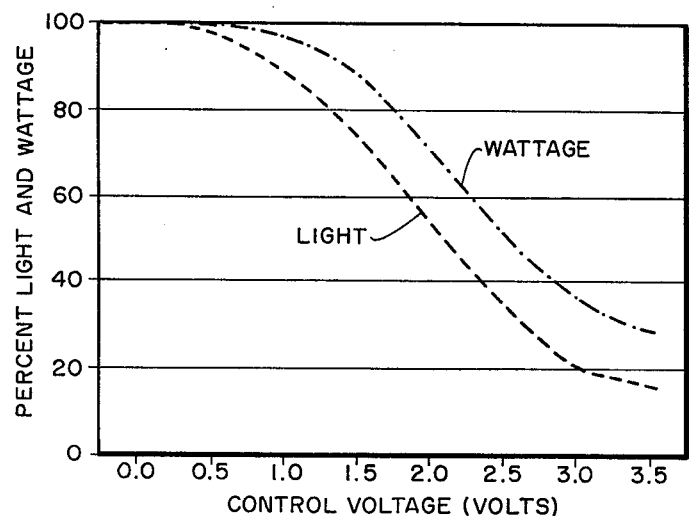
Fig. 8.

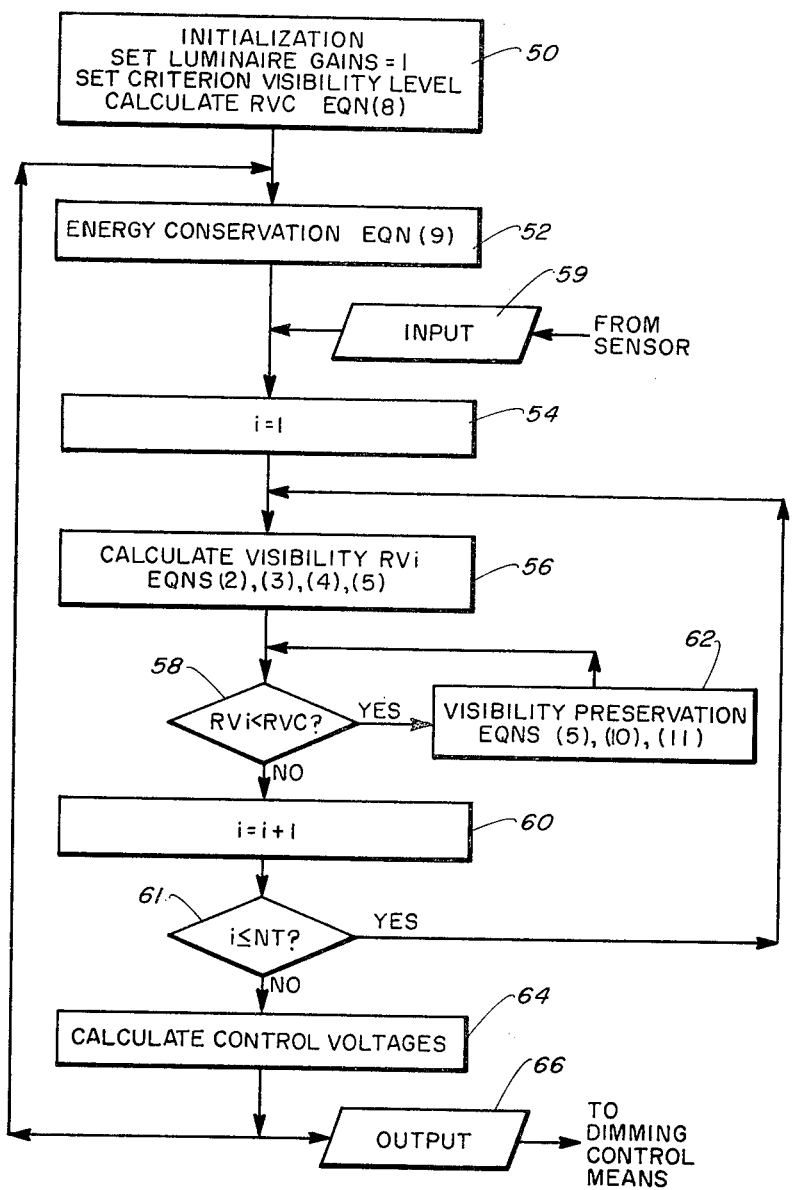
Fig. 3.
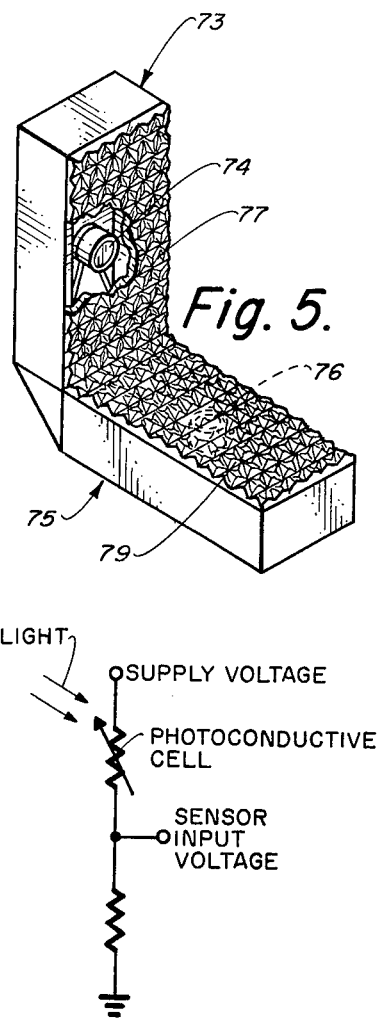
Fig. 5.
Fig. 6.
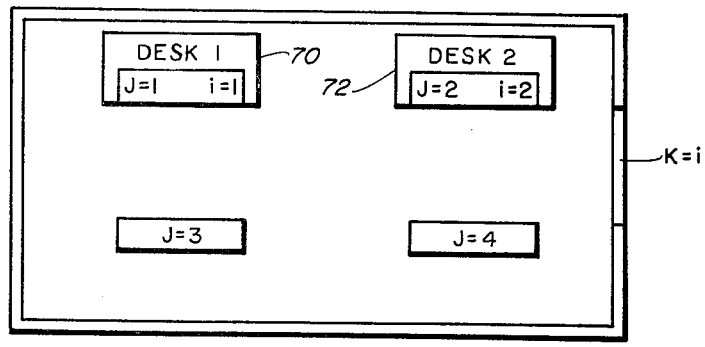
Fig. 4.

EQUI-VISIBILITY LIGHTING CONTROL SYSTEM

BACKGROUND OF THE INVENTION

This invention relates to lighting control systems and more particularly, to a lighting control system which automatically maintains high quality illumination while optimizing the conservation of energy.

Most lighting systems are designed without regard for the benefits of natural daylighting. Daylighting is an illumination source which can be utilized to achieve better conservation of energy through appropriate building design. One recent office building design, for example, uses up to 80 percent natural daylighting. Because the building is also used when it is dark outside, such as on early winter mornings, the building's lighting system must be able to provide illumination over a range of 20 percent artificial lighting (80 percent daylighting) to 100 percent artificial lighting (no daylighting). The only reliable system that can adapt to such a wide range of artificial lighting levels and also optimize the conservation of energy is one which is entirely automatic.

In addition, it is generally recognized that compared to illumination from ceiling mounted electric lighting, an equal amount of daylight illumination from windows can be about three times more effective in producing visibility. Thus, visibility-based lighting controls will result in greater energy conservation than will illumination-based lighting controls. However, presently available automatic dimming systems which adjust for daylighting are photocell controlled. These photocells only respond to raw footcandles which are not directly related to the visibility provided by the illumination sources. The raw footcandle data must be correlated to a criteria for quality task illumination in order to provide a measure of visibility.

SUMMARY OF THE INVENTION

It is therefore an object of the present invention to provide a lighting control system which maintains high quality illumination.

Another object of the present invention is to provide a lighting control system which adjusts for the effects of daylight illumination.

A further object of the present invention is to provide a lighting control system which automatically adjusts the level of artificial lighting to supplement the natural daylighting available.

Another object of the present invention is to provide a lighting control system which responds to quality task illumination criteria.

Yet another object of the present invention is to provide a lighting control system which maintains required visibility while minimizing artificial lighting to conserve energy.

A lighting control system according to the present invention is designed to provide substantially constant visibility at task areas in a work area having variable intensity luminaires and fenestrations. A light-detecting sensor means provides signals which are related to the amount of natural daylight entering the room. These signals are correlated to the background luminance and difference luminance at each task area for each fenestration. The background and difference luminances at each task area from each luminaire is measured with each luminaire at maximum intensity, and these values are used to determine the luminances at different intensities, the luminances being directly proportional to the intensity of the luminaires. The total luminance at each task area is the sum of the fenestration luminances and luminaire luminances. The visibility at each task area is periodically determined from the values of the total background and total difference luminance and this is compared to a criterion visibility. The intensity of the luminaires is then varied to bring the visibility at each task area to the criterion visibility.

Other objects, features, and advantages of the present invention will become apparent from the following detailed description in conjunction with the accompanying drawing wherein:

BRIEF DESCRIPTION OF THE DRAWING

FIG. 1 is a block diagram of an equi-visibility illumination control system in accordance with the present invention;

FIG. 2 illustrates a sensor suitable for monitoring the natural daylighting component of the illumination;

FIG. 3 is a flow diagram illustrating the operation of the equi-visibility illumination control system;

FIG. 4 is a plan view of a room arrangement in an experimental application of the equi-visibility illumination control system;

FIG. 5 illustrates a sensor used in the experimental application;

FIG. 6 is an electrical schematic diagram illustrating a photocell sensor;

FIG. 7 shows daylight illumination measurements relating to the experimental application illustrated in FIG. 4; and FIG. 8 illustrates characteristics of the dimming means used to calculate energy savings of the experimental application of the equi-visibility illumination control system.

DESCRIPTION OF THE PREFERRED EMBODIMENT

The basic visibility terms used and concepts discussed in the following description of the preferred embodiment are well-known in the illuminating engineering field; however, the reader not familiar with these basic terms is referred to *IES Lighting Handbook*, Fifth Edition, Illuminating Engineering Society of North America, New York 1972, J. E. Kaufman and J. F. Christensen, editors.

Referring now to FIG. 1, there are shown first, second, and third sensors 10, 12, and 14, representing a plurality of sensors, for measuring the natural daylighting components of the illumination from the fenestration. The output of the sensors, which is a signal related to the illuminance (the luminous flux incident on the sensor) incident on the sensor, is coupled to a processor means 16, typically a microprocessor having a central processing unit (CPU) 18, a programmable read-only memory (PROM) 20, and a random access memory (RAM) 22. An analog-to-digital converter 24 is coupled between the sensors 10, 12 and 14 and the CPU 18 of the processor means 16 to convert the output of the sensors to a form suitable for input to the digital processor means.

The operations performed in the PROM 20, as will be discussed in detail later, are used to correlate the raw sensor data with predetermined illumination criteria and to determine the minimum amount of artificial lighting required to provide the desired relative visibility for the given arrangement.

The CPU 18 of the processor means 16 is also coupled via a digital-to-analog converter 25 to a first, second and third dimming means 26, 28 and 30, representing a plurality of dimming means. Each dimming means 26, 28 and 30 is coupled to a luminaire, represented by luminaires 32, 34 and 36. The processor means 16 controls the dimming means 26, 28 and 30 to adjust the power to the artificial lighting, luminaires 32, 34 and 36, to provide the minimum amount of artificial lighting to satisfy the criteria (i.e., provide the desired visibility).

Considering now the operation of the lighting control system, the present invention maintains a specified relative visibility (RV), relative visibility being evaluated by the Illuminating Engineering Society (IES) as the Standard Relative Contrast Sensitivity (RCS) Function of Luminance (the eye's sensitivity to contrast) multiplied by the Contrast (C) of the task, where C is given by $|(B-O)/B|$ and B is the luminance of the background, O is the luminance of the object, and B−O is the difference luminance.

In general, an area to be illuminated by a lighting system controlled according to the present invention will contain a plurality of task locations identified herein by $i=1,2,\ldots,NT$ and will be illuminated by a plurality of luminaires identified herein by $j=1,2,\ldots,NL$ and by a plurality of sources of natural daylight (primarily windows) identified by $k=1,2,\ldots,NW$. Each luminaire $(j=1,2,\ldots,NL)$ has an associated dimming means (dimming means 26, 28 and 30 in FIG. 1) having a gain $G_j \leq 1$, which may be used to adjust the power supplied to the luminaire and thus control the amount of artificial light provided by the luminaire.

The relative visibility at each task location is affected by the light from the fenestration (typically windows) and luminaires. The relative visibility at each task location may be determined from the background luminance B and difference luminance D from each luminaire and from each source of natural light. The difference luminance D refers to the difference between the background and object luminances for the task. For example, for the standard IES office task (number two pencil on white paper, with a 25 degree viewing angle), the background luminance B is the luminance of the paper and the object luminance O is the luminance of the characters on the paper.

Considering now the determination of the contribution from the artificial lighting, the background luminance and difference luminance from each luminaire at full gain (of the dimming means) to each task, $BL_{j,i}$ and $DL_{j,i}$, respectively, are determined by calculation or by measurements using an Equivalent Sphere Illumination (ESI) meter (see "Instrument for Measurement of Equivalent Sphere Illumination," *Journal of the Illuminating Engineering Society*, Vol. 7, No. 3, April 1978, pg. 183-189, David L. DiLaura and Steven M. Stannard (authors). Assuming the background and difference luminances from each luminaire are a linear function of the gain of the dimming means associated with the respective luminaires $(j=1,2,\ldots,NL)$, the background and difference luminances can then be calculated at any time as long as the present gain of the luminaires and the values of the luminances at full gain are known. Factors such as lamp lumen depreciation and luminaire dirt depreciation may also effect these quantities; however, these other factors generally require contemporaneous and continual sensor measurements to determine the actual loss in intensity of the luminaires so that the background and difference luminances may be calculated based on the lower luminances at full gain.

The daylighting contribution which is, of course, variable (depending on numerous factors), is calculated by the processor from sensor readings taken at each source of natural light (windows or fenestration). The sensor measurements are correlated to the background luminances $BW_{k,i}$ and difference luminances $DW_{k,i}$ (for each window for each task) from empirical data in the following manner. At each task location, the background luminance $BW_{k,i}$ and difference luminance $DW_{k,i}$ is measured using an Equivalent Sphere Illumination meter and this data is correlated to the raw sensor output signal (for example, the voltage level of a photocell output as illustrated in FIG. 6) at the time the measurements are taken. Sufficient data should be taken to determine the window background luminance $BW_{k,i}$ and the window difference luminance $DW_{k,i}$ for the task to the sensor output signal. Preferably this data should include the effects of time of day, seasonal variations, cloud cover conditions, the effects of artificial shading devices, and any other variations that significantly effect these luminances.

In order to provide a signal which distinguishes the effects of the foregoing conditions, each sensor reading (the raw sensor data) should correlate with a single background luminance $BW_{k,i}$ and a single difference luminance $DW_{k,i}$ for each task. In other words, a single sensor signal should not ambiguously indicate more than a single value for each of the luminances. The possibility of ambiguity arises chiefly because the sensor is preferably located in the vicinity of the window and the variations in the illumination received by the sensor may be very different from the variations in the luminances at the task locations. For example, in experimental work in a room in which venetian blinds were used, it was found that two different slat positions could produce the same sensor reading at a single photocell sensor, even though the daylight illumination levels on a task would be substantially different.

A sensor suitable for use in the present invention and capable of providing unambiguous sensor signals for most variations is illustrated in FIG. 2. The sensor includes three light detecting surfaces 40, 42, and 44, for example photocells, oriented on three different axes so that the sun's rays strike the surfaces of the surface at different angles. One possible arrangement is that the light detecting surfaces 40, 42 and 44 may be oriented orthogonal to each other and disposed in the path of the sun's rays as shown in FIG. 2 so that the sunlight strikes each surface. As the angle of the sun's rays changes due to time of day or seasonal changes, the angles at which the rays strike the photocells change causing the output of the photocells to vary. The three photocell outputs may then be used to determine window background and window difference luminances from the empirically derived relationship between the sensor data and the luminances at the task.

It is noted that the field of view of each light detecting surface should be large enough so that the surface senses the average intensity of the daylight entering the window. For example, in the case where venetian blinds are used to control the amount of daylight entering a room through a window, the field of view of each light detecting surface should be large enough to include both the slats and the openings between the slats to obtain a measurement of the average intensity as viewed from the orientation of the light detecting surface. In the case of a photocell with a small field of view located close to a window, a prismatic lens may be placed in front of the photocell to diffuse the sunlight incident on the lens so that the photocell sees an average intensity.

For the three axis sensors shown in FIG. 2, the relationship between the window background luminances and the sensor output signal (or processor input signal) is of the form:

$$BW_{k,i} = \text{EXP}(b_{0,k,i} + b_{1,k,i}VX_k + b_{2,k,i}VY_k + b_{3,k,i}VZ_k) \quad (1)$$

where
$BW_{k,i}$ = window background luminance,
$VX_k$ = processor input voltage from first photocell,
$VY_k$ = processor input voltage from second photocell,
$VZ_k$ = processor input voltage from third photocell, and
$b_{n,k,i}$ = correlation coefficients (n=0, 1, 2 and 3).

The relationship between the window difference luminance and the window background luminance is then of the form:

$$DW_{k,i} = K_{k,i}BW_{k,i}$$

where
$DW_{k,i}$ = Window difference luminance,
$BW_{k,i}$ = Window background luminance, and
$K_{k,i}$ = correlation coefficients A least squares regression may be applied to equations (1) and (2) to determine the correlation coefficients $b_{n,k,i}$ and $K_{k,i}$ for the specific task and fenestration arrangement under consideration. The window background and difference luminances may be determined (at any time) by solving equations (1) and (2) using the correlation coefficients and present processor input signals from the three-axis sensor.

Continuing the discussion of the operation of the present invention, at any given instant, the electric lighting and daylighting contributions to total background and difference luminances are given by $$B_i = \sum_{j=1}^{NL} G_j BL_{j,i} + \sum_{k=1}^{NW} BW_{k,i} \text{ and} \quad (3)$$

$$D_i = \sum_{j=1}^{NL} G_j DL_{j,i} + \sum_{k=1}^{NW} DW_{k,i}, \text{ respectively.} \quad (4)$$

As noted before, relative visibility (RV) is defined as the Contrast (C) of the task in the real environment times the Relative Contract Sensitivity (RCS) of the eye adapted to the background luminance. Since the contrast is given by the difference luminance divided by the background luminance, relative visibility for task i is given by $$RV_i = \frac{D_i}{B_i} \cdot RCS(B_i). \quad (5)$$

Relative Contrast Sensitivity is a function of the background luminance B and may be approximated by $$RCS = a_0 + a_1 x - a_2 x^2 + a_3 x^3 \quad (6)$$

where $$x = \frac{B}{(\sqrt{10})^n}$$

and $a_0, a_1, a_2$ and $a_3$
have the values shown in Table 1 for n=0,1,...,7 for B between 1 and 10,000 (nits). This approximation is continuous with a maximum error of 0.68 percent and a standard error of estimate of 0.074. It should be noted that other approximations of the Relative Contrast Sensitivity are well known in the art.

TABLE 1

| B | n | $a_0$ | $a_1$ | $a_2$ | $a_3$ |
|---|---|-------|-------|-------|-------|
| 1–3.16 | 0 | 13.5 | 7.14 | 2.03 | .343 |
| 3.16–10 | 1 | 22.9 | 8.85 | 1.45 | .0898 |
| 10–31.6 | 2 | 36.2 | 12.8 | 4.93 | .960 |
| 31.6–100 | 3 | 50.4 | 10.3 | 3.69 | .663 |
| 100–316 | 4 | 62.2 | 8.57 | 2.60 | .415 |
| 316–1000 | 5 | 72.8 | 8.55 | 2.60 | .411 |
| 1000–3162 | 6 | 83.3 | 8.27 | 2.28 | .300 |
| 3162–10000 | 7 | 93.5 | 7.42 | 3.00 | .446 |

In order to maintain a specified relative visibility, the lighting control system must be given a criterion relative visibility. Since most of the literature deals with visibility level (VL) or equivalent sphere illumination (ESI) level, it is convenient to relate RV to VL or ESI. The simplest expression is to determine the relationship between relative visibility (RV) and visibility level (VL).

This relationship is given by $$RV = \frac{C_s \cdot 5.74 \cdot VL}{C_{eq}} \quad (7)$$

where
$C_s$ = sphere contrast, and
$C_{eq}$ = equivalent contrast.

For the standard IES office task (number two pencil on white paper, 25 degrees viewing angle), $C_s = 0.1675$ and $C_{eq} = 0.681$. In this case, therefore, a criterion relative visibility (RVC) can be calculated from a criterion visibility level (VLC) by:

$$RVC = 1.41 \, VLC \quad (8)$$

The processor operates to continually evaluate the equilibrium between two opposing relationships in order to maintain the specified relative visibility with the minimum amount of energy for artificial lighting. The flow chart of FIG. 3 illustrates the procedure. The first step, indicated by block 50, is to initialize the processor with the empirically derived relationship pertinent to the specific room arrangement and lighting system under control. This includes the background and difference luminance, $BL_{j,i}$ and $DL_{j,i}$ for each task from each luminaire at full gain and the correlation coefficients determined for the specific arrangement in the manner previously described for use in equations (1) and (2) in order to calculate the natural light contribution to the total luminances. The criterion visibility level (VLC) is chosen and the criterion relative visibility (RVC) is calculated from equation (8) (for the case where the criterion relative visibility is to be maintained for the standard IES office task). The gain of each of the luminaires (as controlled by the dimming means) is set at unity so that the initial computations are performed for the case where the artificial illumination is at a maximum.

The present luminaire gain setting (unity at this point) is then used to determine if the relative visibility criterion may be satisfied with less luminaire gain in the following manner. A new set of luminaire gains, defined by $$G_j(\text{new}) = G_j(\text{old}) - g \text{ for all } j, \tag{9}$$

where g is a decrement in the gain, is chosen in block 52. The magnitude of the decrement g is determined operationally. As the size of the decrement is increased, the lights will be able to dim at a faster rate. Speed is necessary so that the system does not have a considerable lag time between sensor readings and dimming adjustments. On the other hand, a smaller decrement allows for more subtle changes in light output, which is more desirable for occupant comfort, and for finer tuned energy savings.

Setting $i=1$ at block 54, the relative visibility is calculated for the $i^{th}$ task from equations (1), (2), (3), (4) and (5) as indicated by block 56, based on the input from the window sensor (at block 59) and the $G_j$ (new). This value of relative visibility is compared to the relative visibility criterion at block 58 and if the relative visibility is greater than or equal to the relative visibility criterion, i is set to $i+1$ at block 60. If $i+1$ is less than or equal to NT (the number of tasks), the relative visibility calculation is performed for the $i+1^{th}$ task, and this value is compared to the relative visibility criterion as indicated by block 61. This loop is continued until i is greater than NT.

If the value of relative visibility is less than the relative visibility criterion, the gain from selected luminaires must be increased to preserve visibility. A loop is made through the luminaires, and the luminaire producing the maximum visibility increase per wattage increment is selected to have its gain increased. This can be expressed as $$RV_i(\text{new}) = \text{MAX}\left[\frac{D_i + qDL_{j,i}}{B_i + qBL_{j,i}} \cdot RCS(B_i \, qBL_{j,i})\right] \tag{10}$$

and $$G_j(\text{new}) = G_j(\text{old}) + q \tag{11}$$

where j is the luminaire giving the maximum increase in visibility per watt and q is incremental increase in the gain similar in magnitude to the decrement g. This preservation process is indicated by the loop between visibility comparision block 58 and visibility preservation block 62. The loop is repeated until the relative visibility meets or exceeds the criterion.

When the foregoing process has been completed for all task locations, the dimming control signal is calculated at block 64 and coupled through the processor output 66 to the digital-to-analog converter 25 for output to the dimming control means. The process is then repeated starting at block 52 based on the present set of luminaire gains.

The process illustrated in FIG. 3 conserves energy while maintaining the specified relative visibility by lowering the gain of each luminaire when the RV is greater than the RVC until the RV equals the RVC. In contrast when the amount of artificial light must be increased to reach the RVC, the gain of the luminaire providing the maximum increase in visibility is increased. This optimizes the energy saving while maintaining the required visibility.

AN EXAMPLE

As a further illustration of the present invention, an experimental application of an equi-visibility lighting system to the rectangular room illustrated in FIG. 4 will be described. The artificial lighting for the room is provided by four ceiling-mounted flourescent lamps represented by blocks $j=1$, $j=2$, $j=3$, and $j=4$, while natural lighting is provided through an east facing window, $k=1$. The natural light from the window $k=1$, may be adjusted by a venetian blind (not shown) mounted in the window. Two task areas, $i=1$ and $i=2$, have been defined on desks 70 and 72 below lamps $j=1$ and $j=2$, respectively.

The daylighting was measured by two photoconductive sensors 73 and 75 disposed at right angles to each other, as shown in FIG. 5, and positioned at the window $K=1$. The sensors 73 and 75 include two photocells 74 and 76 (shown in phantom) enclosed in opaque boxes and behind prismatic lenses 77 and 79. The sunlight striking the prismatic lenses 77 and 79 is diffused so that the photocells measure the average intensity of light striking the lenses. The photocell outputs were correlated to the daylighting contribution at the task areas by measuring the resistance of each photocell along with the background luminance and different luminance as measured using an ESI meter. The sample of data taken was sufficient to include the effects of venetian blind slat position, time of day, and clear and cloudy conditions. Based on the sensor electrical diagram shown in FIG. 6, a sensor input voltage to the processor was calculated for each photocell resistance reading. The measured sensor voltages (FIG. 6) were correlated to the background and different luminances.

For the two axis sensor of FIG. 5, the relationship between $BW_{k,i}$ and the sensor output is of the form:

$$BW_{k,i} = \text{EXP}(b_{0,k,i} + b_{1,k,i}VX_k + b_{2,k,i}VY_k) \tag{12}$$

where
$BW_{k,i}$ = window background luminance,
$VX_k$ = processor input voltage from upper photocell 74,
$VY_k$ = processor input voltage from lower photocell 76, and
$b_{n,k,i}$ = correlation coefficients (n=0, 1, and 2).

Use of a least squares multiple regression applied to equation (10) resulted in a coefficient of correlation r of 0.965 at desk 70 and 0.975 at desk 72. In FIG. 4, desk 70 is in the foreground and desk 72 is nearest the window.

The difference luminance can be predicted from equation (2):

$$DW_{k,i} = K_{k,i}BW_{k,i}$$

where
$DW_{k,i}$ = window difference luminance,
$BW_{k,i}$ = window background luminance, and
$K_{k,i}$ = correlation coefficients The error resulting from a least squares regression of equation (2) can be expressed as a standard deviation of 0.039 $K_1$ for desk 70 and 0.054 $K_{1,2}$ for desk 72.

Equations (1) and (2) were developed for an east facing window and do not include the effects of seasonal variation. The effect of seasonal variation, or of sun movement across a south facing window, would probably necessitate the use of a third photocell mounted at right angles to each of the other two photocells. (See FIG. 2 for a three cell sensor.)

For the arrangement shown in FIG. 4, the correlation constants shown in Table 2 and Table 3 were determined from ESI meter measurements and correlated to equations (12) and (2). The units are metric, with the luminance in nits and illuminance in lux.

TABLE 2

| Luminaire | Task i = 1 | | | Task i = 2 | | |
|---|---|---|---|---|---|---|
| | $BL_{j,i}$ | $DL_{j,i}$ | $EL_{j,i}$ | $BL_{j,2}$ | $DL_{j,2}$ | $EL_{j,2}$ |
| j = 1 | 73.2 | 10.0 | 266 | 12.3 | 2.0 | 45 |
| j = 2 | 14.9 | 2.6 | 56 | 81.0 | 10.9 | 294 |
| j = 3 | 17.8 | 2.7 | 143 | 8.9 | 1.5 | 34 |
| j = 4 | 9.3 | 1.6 | 37 | 19.3 | 2.9 | 152 |

TABLE 3

| Task | Window k = 1 |
|---|---|
| i = 1 | $BW_{1,1} = EXP(-393 + .487\ VX_1 + .198\ VY_1)$<br>$DW_{1,1} = .173\ BW_{1,1}$<br>$EW_{1,1} = 3.98\ BW_{1,1}$ |
| i = 2 | $BW_{1,2} = EXP(.580 + 0819\ VW_1 + .612\ VY_1)$<br>$DW_{1,2} = .173\ BW_{1,2}$<br>$EW_{1,2} = 3.88\ BW_{1,2}$ |

Two new terms have been introduced. The illumination from luminaire j at full gain to task location i is $EL_{j,i}$ and the illumination from window k to task location i is $EW_{k,i}$. These new terms are not needed for relative visibility calculations, but are given as a point of reference for illumination calculations in comparing energy consumption of other illumination systems with energy consumption of the present equi-visibility system.

Daylight illumination measurements for one clear and one cloudy day near the end of October are shown in FIG. 7. Lines 80 and 82 apply to task 1 and task 2, respectively, on the cloudy day and lines 84 and 86 apply to task 1 and task 2 on the clear day. On the basis of these illumination measurements, the energy savings from four different control systems was simulated:

(1) an on-off control system,
(2) a high-low-off control system,
(3) an equi-illumination control system, and
(4) the equi-visibility control system.

The control criteria was 540 lux for the on-off, high-low-off, and equi-illumination systems, and a 6.5 visibility level for the equi-visibility system. This criteria corresponds approximately to the illumination and visibility of the electric lighting at full intensity with no daylight contribution.

For the on-off control system, only luminaires j=2 and j=4 are controlled. Since luminaires 1 and 3 provide a total of 79 lux to task 2, luminaires j=2 and j=4 can be turned off anytime the daylighting illumination is above 461 lux as this will meet the necessary 540 lux criteria. From FIG. 7 this means that luminaires j=2 and j=4 can be turned off for about three hours on clear days and not at all on cloudy days.

For the high-low-off control system, only luminaires j=2 and j=4 are controlled. These luminaires will be turned off the same as for the on-off system. In the low mode, luminaires j=2 and j=4 provide 223 lux to task 2. Thus these luminaires can be turned to the low mode anytime the daylighting illumination is at least 238 lux (540−79−223), but less than 461 lux. From FIG. 7, this range is met for 2 hours on clear days and for 3½ hours on cloudy days.

For the equi-illumination system and the equi-visibility system, all four luminaires are individually controlled by dimming units with the characteristics given in FIG. 8. An assumption is made that the illumination under luminaire j=3 is the same as the illumination under luminaire j=1, and that the illumination under luminaire j=4 is the same as for luminaire j=2. For each luminaire, wattage W is related to luminaire gain $G_j$ by the following empirical equation which was derived using the dimming unit characteristics of FIG. 8:

$$W = (96) \times (0.053 + 1.56 G_j - 0.609 G_j^2) \quad (13)$$

Because the light output from any luminaire will affect the light output of the other luminaires, an iterative solution is needed. Therefore the equi-illumination and equi-visibility systems were simulated using a computer. For the equi-illumination system, the methodology used was similar to that described for the on-off and high-low-off systems. In the equi-visibility system, an iterative computer simulation was made which essentially corresponded to the FIG. 3 flow chart. For both equi-illumination and equi-visibility systems, hourly calculations of wattage were made from equation (13), and trapezoidal integration was used to calculate energy.

The energy consumption and percent energy savings as determined by the simulations are shown in Tables 4 and 5. The equi-visibility control system saved considerably more energy than any of the other three systems. In fact, it saved about three times more energy than the equi-illumination system saved.

TABLE 4

| ENERGY CONSUMPTION (KILOWATT-HOURS/DAY) | | | | |
|---|---|---|---|---|
| WEATHER | ON-OFF | HIGH-LOW-OFF | EQUI-ILLUMINATION | EQUI-VISIBILITY |
| Clear | 2.88 | 2.69 | 2.69 | 1.44 |
| Cloudy | 3.46 | 3.12 | 3.00 | 2.07 |

TABLE 5

| | ENERGY SAVINGS (PERCENT) | | | |
|---|---|---|---|---|
| WEATHER | ON-OFF | HIGH-LOW-OFF | EQUI-ILLUMINATION | EQUI-VISIBLITY |
| Clear | 17 | 22 | 22 | 58 |
| Cloudy | 0 | 10 | 13 | 4 |

An equi-visibility lighting control system has been described which provides quality illumination while providing substantial energy conservation compared to alternative systems.

Obviously many modifications and variations of the present invention are possible in the light of the above teachings. It is therefore to be understood that within the scope of the appended claims the invention may be practiced otherwise than as specifically described.

What is claimed is:

1. A method for providing a substantially constant specified relative visibility with time over one or more task areas within a work area having one or more sources of natural daylight to provide natural daylight illumination and one or more luminaires to provide artificial illumination, the illumination provided by the one or more luminaires being variable, said method comprising:

a. determining by measurement the background luminance and the difference luminance for each task area for each of said one or more luminaires as a function of the illumination provided by said one or more luminaires; each luminaire providing full illumination, the background luminance and difference luminance for each task area being a linear function of the illumination provided by each luminaire;

b. determining the background luminance and difference luminance for each task area as a function of the natural daylight illumination entering said work area through said one or more sources of natural daylight, comprising:

b1. sensing the natural daylight illumination entering said work area through said one or more sources of natural light with said sensor means providing a plurality of simultaneous signals related to the intensity of said natural daylight illumination;

b2. measuring the background luminance and difference luminance for each task area with an Equivalent Sphere Illumination meter for each set of three simultaneous sensor signals;

b3. repeating steps b1 and b2 to obtain the simultaneous sensor signals and background luminance and difference luminance readings as the natural daylight illumination varies over time; and b4. correlating the plurality of simultaneous sensor signals with the background luminance and difference luminance for each task to reestablish the background luminance and difference luminance as a function of the three sensor signals;

c. measuring the natural daylight illumination entering said work area through said one or more sources of natural light, comprising:

disposing sensor means in the path of the sun's rays entering said work area through said one or more sources of natural daylight, a sensor means associated with each said source of natural daylight to measure the natural daylight entering said work area, each said sensor means including a plurality of light detecting surfaces disposed in intersecting planes so that the light detecting surfaces are oriented differently relative to the direction of the sun's rays, the sun's rays thereby striking the light detecting surfaces at a different angle;

d. correlating the present artificial illumination provided by said one or more luminaires with the background luminance and difference luminance at each said task area as a function of the artificial illumination to determine the background luminance and difference luminance at each said task area due to said artificial illumination;

e. correlating the measured natural daylight illumination entering said work area with the background luminance and difference luminance at each said task area as a function of the natural daylight entering said work area to determine the background luminance and difference luminance at each task area due to the natural daylight illumination;

f. calculating the relative visibility at each said task area based on the present difference luminance and background luminance at each said task area due to the combined artificial and daylight illumination;

g. comparing the relative visibility calculated in step f. with the specified relative visibility;

h. varying the artificial illumination from said one or more luminaires to provide the specified relative visibility at each said task area, the artificial illumination being increased by an incremental amount for the luminance producing the maximum relative visibility increase per incremental increase in illumination if the calculated relative visibility is less than the specified relative visibility, the artificial illumination being decreased by an incremental amount for each luminaire if the calculated relative visibility is greater than the specified relative visbility; and i. continuously periodically repeating step (c) through step (h) to maintain the specified relative visibility.

2. The method as recited in claim 1 wherein step f comprises:

calculating the relative visibility at each said task area according to the relationship $$RV_i = \frac{D_i}{B_i} \cdot RCS(B_i)$$

where i indicates the $i^{th}$ task, $B_i$ is the background illuminance of the $i^{th}$ task, and is given by $$B_i = \sum_{j=1}^{NL} G_j BL_{j,i} + \sum_{k=1}^{NW} BW_{k,i}$$

$D_i$ is the difference luminance of the $i^{th}$ task and is given by $$D_i = \sum_{j=1}^{NL} G_j DL_{j,i} + \sum_{k=1}^{NW} DW_{k,i}$$

where j indicates the $j^{th}$ luminance of a total NL luminaires, and k is the $k^{th}$ window of a total of NW windows, $G_j$ is the gain of the $j^{th}$ luminaire, and RCS is the relative contrast sensitivity of the eye adapted to the background luminance.

3. The method as recited in claim 1 wherein said plurality of light detecting surfaces includes at least two light detecting surfaces disposed in intersecting orthogonal planes.

4. The method as recited in claim 1 wherein said plurality of light detecting surfaces includes three light detecting surfaces disposed in intersecting orthogonal planes.

* * * * *